United States Patent [19]

Peitz

[11] Patent Number: 5,528,665

[45] Date of Patent: Jun. 18, 1996

[54] TELEPHONE EXCHANGE APPARATUS FOR BOTH MOBILE AND STATIONARY STATIONS, IN WHICH ALL COMMUNICATION CHANNEL PAIRS ARE ASSIGNABLE FOR ALL STATIONS

[75] Inventor: Albert Peitz, Munich, Germany

[73] Assignee: Peitz GmbH, Munich, Germany

[21] Appl. No.: 369,300

[22] Filed: Jan. 6, 1995

Related U.S. Application Data

[63] Continuation of Ser. No. 87,754, filed as PCT/EP92/02987, Dec. 23, 1987 published as WO93/13632, Jul. 8, 1993, abandoned.

[30] Foreign Application Priority Data

Dec. 31, 1991 [DE] Germany ............... 41 43 266.5

[51] Int. Cl.[6] ..................... H04Q 7/38; H04Q 7/20
[52] U.S. Cl. ........................ 379/58; 370/95.1
[58] Field of Search ................. 379/58, 56, 59; 370/95.1

[56] References Cited

U.S. PATENT DOCUMENTS

| | | | |
|---|---|---|---|
| 3,806,804 | 4/1974 | Mills et al. | 379/58 |
| 4,792,948 | 12/1988 | Harger et al. | 370/95.1 |
| 5,251,053 | 10/1993 | Heidemann | 359/145 |

FOREIGN PATENT DOCUMENTS

| | | |
|---|---|---|
| 0368673A1 | 5/1990 | European Pat. Off. . |
| 0421602A3 | 4/1991 | European Pat. Off. . |
| 0421602A2 | 4/1991 | European Pat. Off. . |
| 4008790A1 | 9/1991 | Germany . |

*Primary Examiner*—Dwayne D. Bost
*Assistant Examiner*—William Cumming
*Attorney, Agent, or Firm*—Banner & Allegretti, Ltd.

[57] ABSTRACT

A telephone exchange apparatus for both mobile and stationary subscribers in which the stationary subscribers are not assigned permanent channel pairs but rather are treated as the mobile subscribers and assigned channel pairs at the time a telephone connection is made. All connection channel pairs are within the frequency spectrum of the broad band cable connecting the stationary subscribers.

5 Claims, 3 Drawing Sheets

TELEPHONE EXCHANGE APPARATUS FOR BOTH MOBILE AND STATIONARY STATIONS, IN WHICH ALL COMMUNICATION CHANNEL PAIRS ARE ASSIGNABLE FOR ALL STATIONS

This application is a continuation of Ser. No. 087,754, filed Jul. 7, 1993, now abandoned.

RELATED APPLICATIONS

The invention relates to a circuit arrangement for public switched networks, preferably public telephone networks as defined in the preamble of claim 1.

Such a circuit arrangement is disclosed in DE-OS 40 08 790. The said German application was published Sep. 26, 1991 and patented Apr. 2, 1992.

Said publication concerns a uniform public switched network with mobile and stationary subscribers, in which network only the stationary subscribers are connected through a broad-band cable to an exchange, while the mobile subscribers are connected to the exchange through their radio base stations and separate digital signal lines. Such manner of connection of the mobile subscribers does not allow the communication-channel pairs accessible to the stationary subscribers to be made available also to the mobile subscribers, and vice versa.

The object of the present invention is to design the initially described circuit arrangement in such a manner that a more economical usage of the communication-channel pairs is made possible. The object of the invention is achieved by the features of the characterizing part of claim 1.

SUMMARY OF THE INVENTION

The present application is a continuation of application Ser. No. 08/087,754, filed Jul. 7, 1993, now abandoned, which in turn was based on PCT application PCT/EP92/02987, filed Dec. 23, 1992. The German priority application is P41 43 266.5, filed Dec. 31, 1991, three months after publication of the original German document DE-OS 40 08 790, referred to above.

The invention permits the common connection of the radio base stations and of the stationary subscribers to one and the same broad-band cable. This provides the advantage that all communication-channel pairs made available by the exchange can be made available, with equality of exchangeability, to all subscribers of the mobile and stationary networks, with the result that a suitable remedy is possible if there are special traffic loads in one or other of the networks. Namely, it can be assumed that the traffic peaks in the mobile and stationary networks will not occur simultaneously, since, for example, during the ride to the city in the morning, the traffic peak will be concentrated on the mobile network, whereas, subsequently, during working hours, there will be a traffic peak in the stationary network. Since the connection of both the radio base stations and also the stationary subscribers to the broad-band cable means that all available communication-channel pairs are accessible both to the stationary subscribers and also to the mobile subscribers, it is possible, in a manner of speaking, for the communication-channel pairs to be moved to wherever they are required in the greatest number. This means that, overall, a suitably small number of communication-channel pairs will suffice. The organization of mobile and stationary networks in the form of a uniform network with the aforementioned means of remedy has not existed hitherto. Moreover, as a result of the design of the common transmission element and the arrangement of radio-base-station terminals, it is possible, on the one hand, for the communication-channel pairs made available by the exchange to be converted by the transmission element at relatively low frequency as a whole into optical signals to be transmitted by the broad-band cable, with the radio-base-station terminals being left with the task of converting the communication-channel pairs received by them to the respective radio frequency.

To date, only in EP 0 368 673 A1 has it been proposed to economize on communication-channel pairs in a mobile radio network in that the individual radio base stations are connected by broad-band cable to a central exchange. This makes it possible for all radio base stations to have access to the communication-channel pairs made available by an exchange.

With the introduction of mobile radio networks, there has been a tremendous rise in the number of subscribers to such networks and therefore in the traffic to be handled by them, and the growth rates continue to be high. Conversely, the suitable radio-frequency spectra available for mobile communications are very limited, with the result that, in the past, a whole series of developments and measures were undertaken in order to cater for the sharp and constant growth in the numbers of subscribers and in the resultant traffic. Thus, for example, further radio-frequency bands (radio-supply layers) were developed, said radio-supply layers being suitable, using present-day techniques, for two-way connections by radio. Mention might be made here of the 900 MHz band with a radio-frequency spectrum of 2×25 MHz (=1,000 radio-channel pairs); the 1.8 GHz band with a radio-frequency spectrum of 2×75 MHz (=3,000 radio-channel pairs) as well as mobile satellite radio and telepoint technology. Furthermore, digital mobile radio has been developed in place of analog techniques and has been standardized in the Group Special Mobile (GSM). Digital speech transmission by radio has permitted a considerably more advantageous reusability of a frequency spectrum than in the case of analog systems, which, today, usually operate in the 450 MHz band.

The circuit arrangement according to the invention makes it possible, within the definition of the present invention, to supply further frequency bands within which radio base stations are served, i.e. the aforementioned radio-supply layers, with this being accomplished in that connected to the broad-band cable is a plurality of groups of radio base stations, whose radio channels are each situated in different frequency bands (radio-frequency layers). This results in a public switched network in which a plurality of radio-supply layers is uniformly served through a broad-band cable and the exchange connected to said broad-band cable.

As all mobile subscribers thus connected via the radio base stations to the broad-band cable have access to all communication-channel pairs, it is possible, depending on the level of traffic of each radio base station and thus each service area served by a radio base station, to assign the instantaneously required number of communication-channel pairs out of the total number of communication-channel pairs made available at the exchange, said number therefore varying accordingly depending on the level of traffic. Thus, if there is a shift in demand for communication-channel pairs from one radio base station to another radio base station, it is possible, for example, for the number of communication-channel pairs in one of the radio base stations to be reduced and, in return, for the number of communication-channel pairs to be correspondingly increased in the other radio base station. In this manner, it is possible, within the supply area, which contains a large number of radio base stations, to achieve a balance of communication-channel pairs across the entire public switched network, said balance taking account of the overall traffic situation.

The aforedescribed circuit arrangement according to the invention can be improved with regard to the respectively required bandwidth of the radio-frequency ranges for each radio base station, with this being accomplished in that the exchange is assigned a control apparatus, with—out of the radio channels available to all radio base stations, said radio channels being transmitted through the intermediary of transmitting/receiving apparatuses provided in said radio base stations—selected radio channels each being assigned by said control apparatus to a radio base station, with said control apparatus storing said assignment with regard to the number and respective frequency position of the individual radio channels and fixing said assignment in optionally variable manner in each radio base station by activation of the relevant transmitting/receiving apparatuses.

These measures ensure that the circuit arrangement can be adapted to different traffic loads from radio base station to radio base station, with this being accomplished by the control apparatus, which makes optionally variable the assignment of the radio channels to the individual radio base stations, with the result that, for example, for week days in city areas, a radio-frequency range of greater bandwidth can be assigned to the relevant radio base stations, whereas, for the same time in the other areas, the relevant radio-frequency ranges can be correspondingly restricted. Conversely, at weekends and on public holidays, the radio-frequency range for the radio base stations of the relevant rural areas can be suitably extended and be reduced for the urban areas. This means that the total required bandwidth of the radio-frequency spectrum for all radio base stations can be reduced as compared with the fixed assignment of a radio-frequency range for each radio base station.

The assignment of the radio channels to the radio base stations and thus the adaptation of the bandwidth of the respective radio-frequency range to the particular level of traffic can be further improved in that the control apparatus comprises a traffic-measuring apparatus, said traffic-measuring apparatus determining the instantaneous traffic load on all radio base stations and communicating to the control apparatus the load signals representing the traffic load, with the control apparatus, in assigning the individual radio channels, taking account of the geographical location of said radio base stations by logically combining the load signals with interference indicators, said interference indicators indicating mutually interfering radio channels.

This ensures that account can be taken of the instantaneous traffic situation of the participating radio base stations throughout the entire network, with the result that there is, across all radio base stations, an assignment of radio channels appropriate to the respective levels of traffic. This allows optimal utilization of the total available bandwidth of the radio-frequency spectrum.

In such a uniform network comprising mobile and stationary subscribers, in which all subscribers have access in functionally identical manner to the available communication-channel pairs, it is possible in advantageous manner to provide the mobile subscribers and the stationary subscribers with uniform subscriber terminals. This is because such uniform subscriber terminals are called upon to process the same signals, namely to transmit their identification and to select the communication-channel pair assigned to them, with the result that, in this regard and with respect to encoding, the same signal processing has to be performed. With regard to the manufacture of the subscriber terminals, this results, owing to their uniformity and large number, in considerable cost savings and, furthermore, because of the uniform signal processing, also in a high degree of user-friendliness. This means that each subscriber in such a public switched network is only confronted with the controls on the subscriber terminals of just one system.

BRIEF DESCRIPTION OF THE DRAWINGS

The invention is described in greater detail in the following with reference to FIGS. 1 and 2, in which.

DESCRIPTION OF THE PREFERRED EMBODIMENT

Figure 2:
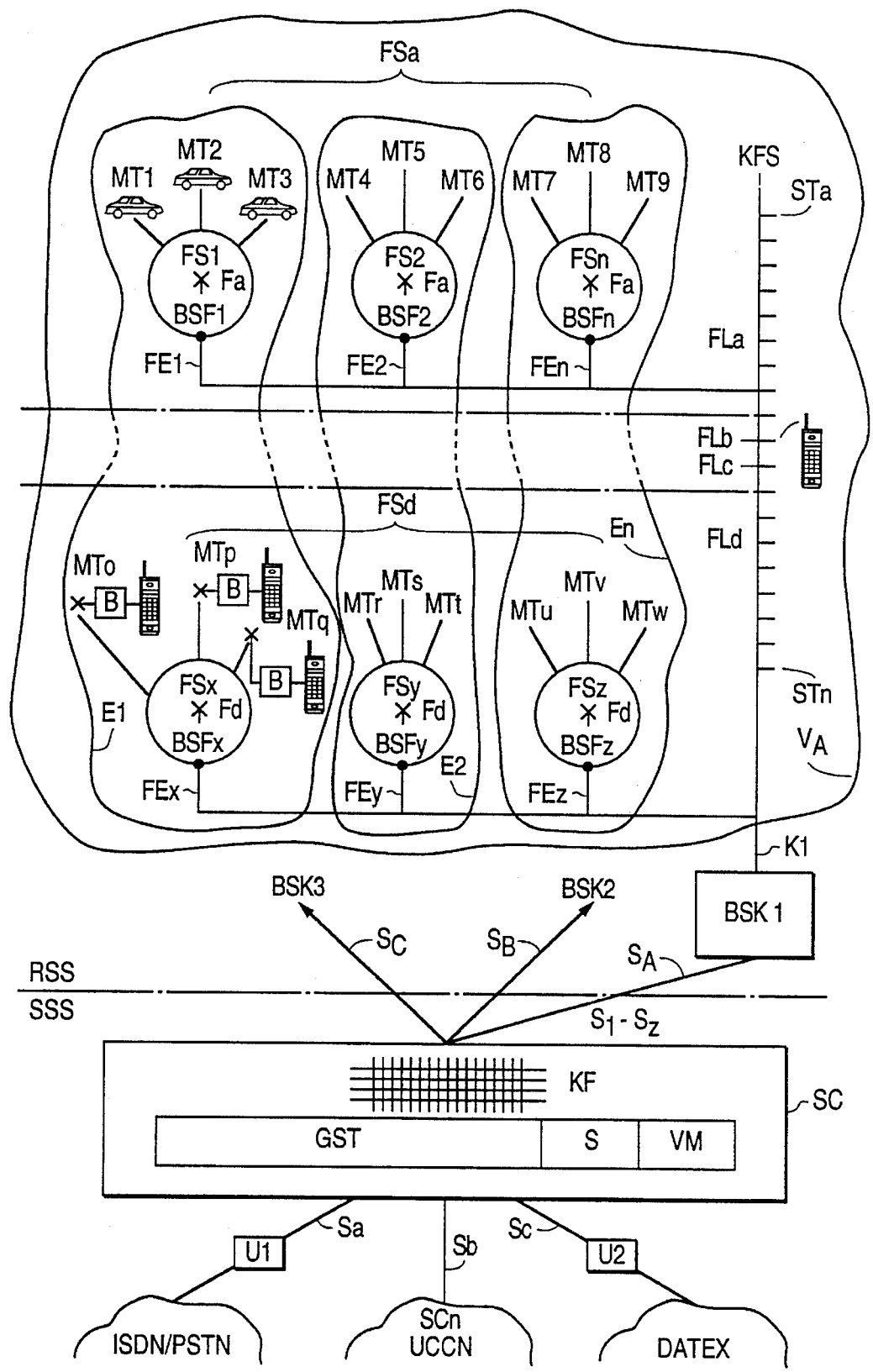
FIG. 2 shows the public switched network according to the invention, in the form of a network both for mobile subscribers with a plurality of radio-supply layers and also for stationary subscribers.

The top half of FIG. 2 shows the supply area VA of a public switched network, which may also comprise further supply areas. A supply area VA consists of a radio-access system RSS with a plurality of radio-supply layers FLa–FLd, via which the mobile subscribers MT1–MT9, MTo–MTw have access to the exchange SC.

Each radio-supply layer FLa–FLd operates in its own frequency band Fa–Fd. Let it be assumed, for example, that the herein shown radio-supply layer FLa operates with a relatively high transmission power in the 900 MHz band Fa with a radio-frequency spectrum FSa of 2×25 MHz and supplies mobile subscribers MT1–MT9 with car telephones over relatively large service areas E1, E2–En, while the radio-supply layer FLd operates with a relatively low transmission power in the 1.8 GHz band Fd with a radio-frequency spectrum FSd of 2×75 MHz and supplies mobile subscribers MTo–MTw with handhelds over smaller service areas. The stationary subscribers STa–STn of the supply area VA are connected to the exchange SC via a broad-band cable K1, said broad-band cable K1 extending directly to the subscribers.

Important with regard to an understanding of the principle according to the invention is the fact that a supply area, such as VA, covers a relatively large area with very many service areas and the connected stationary subscribers, such as STa–STn, and the radio-supply layers FLa–FLd with the service areas E1, E2–En are geographically superimposed.

Each radio-supply layer FLa–FLd of a supply area consists of a plurality of radio base stations BSF1–BSFn, BSFx–BSFz, which are each connected, via their radio-base-station terminals FE1–FEn, FEx–FEz, to a broad-band cable, preferably a fibre-optic cable K1, to the exchange SC, said broad-band cable transmitting as the cable frequency spectrum KFS1 all the communication-channel pairs available to said radio base stations. To establish a connection, the radio base stations BSF1–BSFn, BSFx–BSFz convert a communication-channel pair to the radio-frequency range FS1–FSa, FS–FSz assigned to each radio base station, said radio-frequency range FS1–FSa, FSx–FSz corresponding to a proportion of the radio-frequency spectrum FSa–FSd of a radio-supply layer FLa–FLd.

Connected before the broad-band cables are common transmission elements BSK1, BSK2, BSK3, which generate the cable frequency spectrum KFS, as explained in detail with reference to FIG. 3, with the frequency coverage of the cable frequency spectrum KFS being dimensioned such that all the communication-channel pairs made available by the exchange SC for that supply area fit into the cable frequency spectrum KFS and that, consequently, the mobile subscribers MT1–MT9, MTo–MTw have access to all said communication-channel pairs in accordance with the assignment implemented by the exchange SC.

The transmission elements BSK1, BSK2, BSK3 are connected in known manner via digital signal lines SA, SB, SC to the switching network KF of the exchange SC, through which lines digital channels (communication-channel pairs) s1–s2 are made available for conversion to frequency-modulated radio channels in the transmission elements BSK1, BSK2, BSK3.

Figure 1:
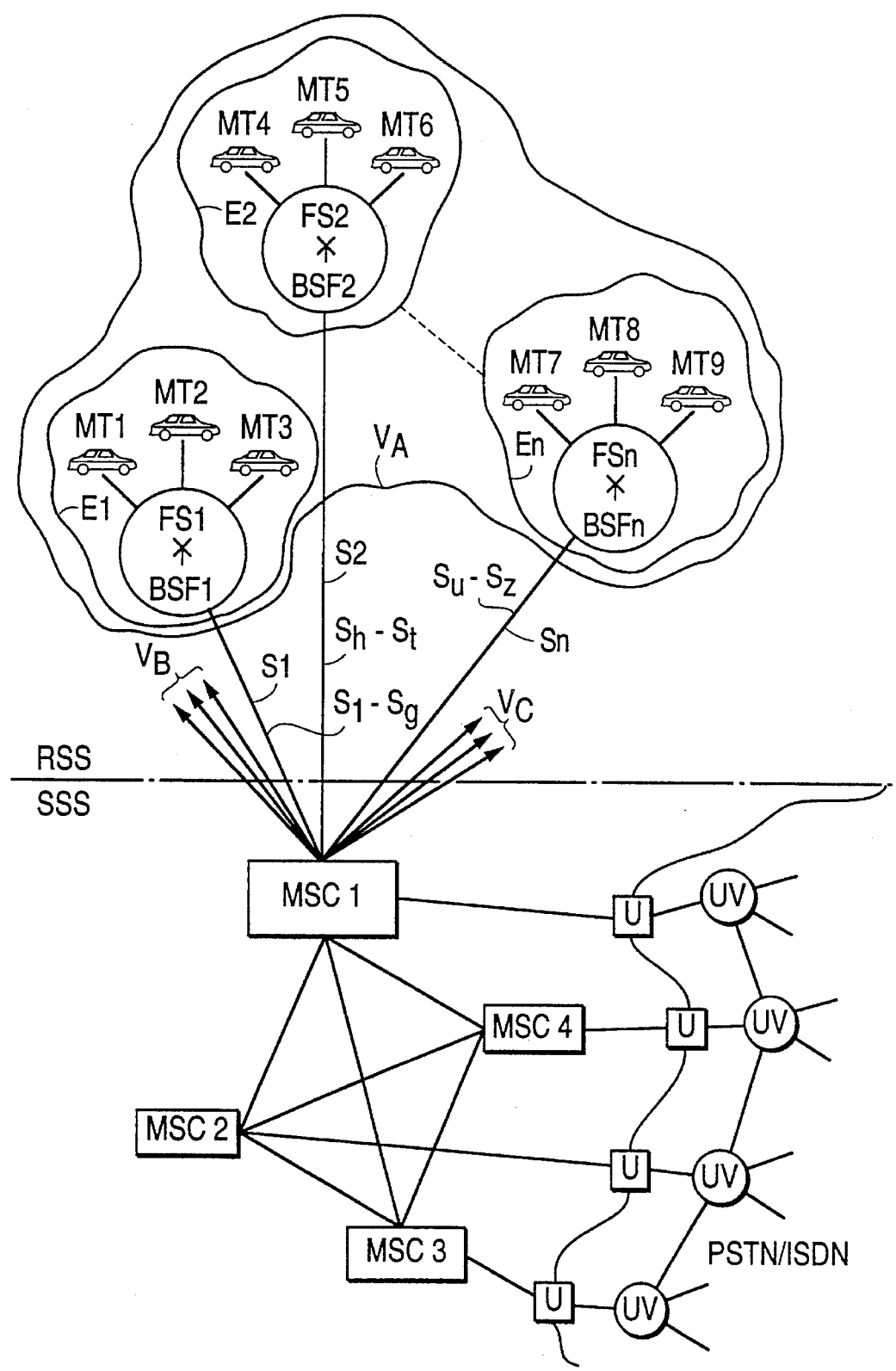
FIG. 1 shows the aforementioned known mobile communication system.

Even if a sufficient radio-frequency spectrum FSa were available for a radio-supply layer, such as FLa, in a supply area VA in order, in currently conventional manner, permanently to assign to all radio base stations BSF1, BSF2–BFSn a sufficient radio-frequency range FS1, FS2–FSn appropriate to their peak-traffic load, the circuit arrangement according to the invention provides tremendous benefits as compared with the known method described in FIG. 1. These benefits are explained with reference to an example:

Let it be assumed that the radio-supply layer FLa operates in the 900 MHz frequency band with a radio-frequency spectrum FSa of 2×25 MHz, corresponding to 1,000 communication-channel pairs (1 communication channel occupies 25 kHz in the radio-frequency spectrum). Let it further be assumed that said supply area covers a city area including the peripheral zones and consists of 7 service areas E1–E7. Let the peak-traffic loads of the individual service areas (radio base stations) be as follows:

| | | | |
|---|---|---|---|
| E1 | 50 erlang | 66 speech-channel pairs | 1.65 MHz |
| E2 | 70 erlang | 88 speech-channel pairs | 2.2 MHz |
| E3 | 150 erlang | 174 speech-channel pairs | 4.35 MHz |
| E4 | 250 erlang | 276 speech-channel pairs | 6.9 MHz |
| E5 | 200 erlang | 228 speech-channel pairs | 5.7 MHz |
| E6 | 20 erlang | 32 speech-channel pairs | 0.8 MHz |
| E7 | 80 erlang | 00 speech-channel pairs | 2.5 MHz |
| Total | 820 erlang | 964 speech-channel pairs | 24.1 MHz |

As initially explained, the peak traffic, comparable with road traffic, for mobile network access is subject to large fluctuations in time and place. Experience shows that the sum of the total maximum traffic in a supply area is sometimes less than 50% of the sum of the individual traffic peaks in the service areas E1–E7 in that supply area. In the example, let it be assumed that the maximum total traffic amounts to 70% of the individual traffic peaks of the service areas E1–E7, i.e. 820×0.7=574 erlang. To be able to serve this traffic with an allowable loss of 0.5%, it is sufficient to have 612 communication-channel pairs; that is, even if the method according to the invention were to be employed for just one single radio-supply layer, it would be possible to save on 964–612=352 conversion apparatuses and on 352 connections to the switching network of the exchange, in addition to the considerably lower connection costs of the broad-band cable.

Shifts in traffic must be expected over the useful life of such a network. The common control GST of the exchange SC, which basically controls the setting of the switching network KF, is supplemented by the control apparatus S, which is capable, via signalling channels, of controlling transmitting/receiving apparatuses S/E, present in all radio base stations as a part of the radio-base-station terminals FE, in such a manner that the assignment of the radio channels (communication-channel pairs) can be varied with regard to their number and frequency position in the radio-frequency range FS1–FSn, with this making it possible in simple manner to adapt to such a changed traffic situation, such as weekend traffic situation/week-day traffic situation.

However, as the number of subscribers to mobile public switched networks increases, it is precisely the available radio-frequency ranges that constitute the actual bottleneck. In a further embodiment of the invention, the aforementioned control apparatus S is provided with a traffic-measuring apparatus VM, said traffic-measuring apparatus VM determining the instantaneous traffic load on all radio base stations (service areas) of a supply area and communicating to the control apparatus S the load signals representing the traffic load. Since the control apparatus S knows the geographical locations of the individual radio cells, it is in a position, taking account of the non-interfering frequency ranges with respect to adjacent radio cells, to increase or reduce the radio-frequency ranges FS1, FS2–FSn in such a manner that each radio base station has so many radio channels that it is able precisely to cope with the instantaneous level of traffic in its service area.

As is shown by the indicated example, it is thus possible to improve the degree of utilization of a specified radio-frequency spectrum FSa–FSd, for example, by a factor of 1.5–2.

The public switched network, consisting of supply areas with the radio-access system RSS and the stationary subscribers STa–STn, forms geographically superimposed network accesses, with by far the largest proportion of traffic continuing to flow to and from those subscribers STa–STn connected to the wire-bound, stationary network. As initially explained, the traffic peaks in the stationary network and in the radio-access system come at different times, and, moreover, the increasing use of the radio telephone is leading to a levelling-off of the traffic peaks in the stationary network. It is, therefore, extremely advantageous to provide the mobile and stationary subscribers with access to the same communication-channel pairs, because this allows a further considerable reduction in the total number of conversion apparatuses as well as in the number of lines at the exchange SC. As shown in FIG. 2, this is achieved in that connected to the broad-band cable, e.g. K1, are not only the radio base stations BSF1–BSFn, BSFx–BSFz, but also the stationary subscribers STa–STn, who now likewise have access, in functionally identical manner to the mobile subscribers, to the same cable frequency spectrum KFS and thus to all communication-channel pairs made available by the exchange SC via the broad-band cable K1.

A radio-access system RSS with a plurality of radio-access layers FLa–FLd of the kind shown in FIG. 2 is referred to also as a multi-layer radio supply if said radio-access layers FLa–FLd form a uniform, common public switched network, i.e. if they are connected within a supply area to the same exchange SC. Such a circuit arrangement provides the advantage that stationary network access and all mobile network accesses in the various radio-supply layers FLa–FLd require, in total, only as many communication-channel pairs for a supply area, such as VA, as are necessary for handling the simultaneous traffic peak of all service areas in the individual radio-supply layers and in the stationary network access. In the long term, therefore, such an arrangement offers ideal potential for the efficient utilization of all radio-frequency spectra in the frequency bands of the radio-supply layers as well as the minimization of costs both in respect of the conversion apparatuses and connection circuits to the switching network of the exchange and also in respect of the cabling of the stationary subscribers and the radio base stations.

The use of so-called Booster B in automobiles and for handhelds, which adapts to the transmission levels and frequency bands used in the individual radio-supply layers, makes it possible, throughout the entire network, to employ uniform subscriber terminals, which can be used, for example, in buildings on the stationary network access without additional apparatuses using a connecting cord or a radio interface of low transmission power.

For the sake of completeness, FIG. 2 further shows the call-processing subsystem SSS and the interconnection of the exchange SC with the currently existing ISDN/PSTN call-processing networks via the digital signal lines Sa and the matching apparatuses U1 as well as the connection to the text and data networks (Datex) via the digital signal lines Sc and the matching apparatuses U2 and the connection to further exchanges SCn of a new, uniform, common public switched network UCCN via the digital signal lines Sb without matching apparatuses, since, in such a network, the methods of encoding, call processing and transmission are uniform and matching is no longer required.

Figure 3:
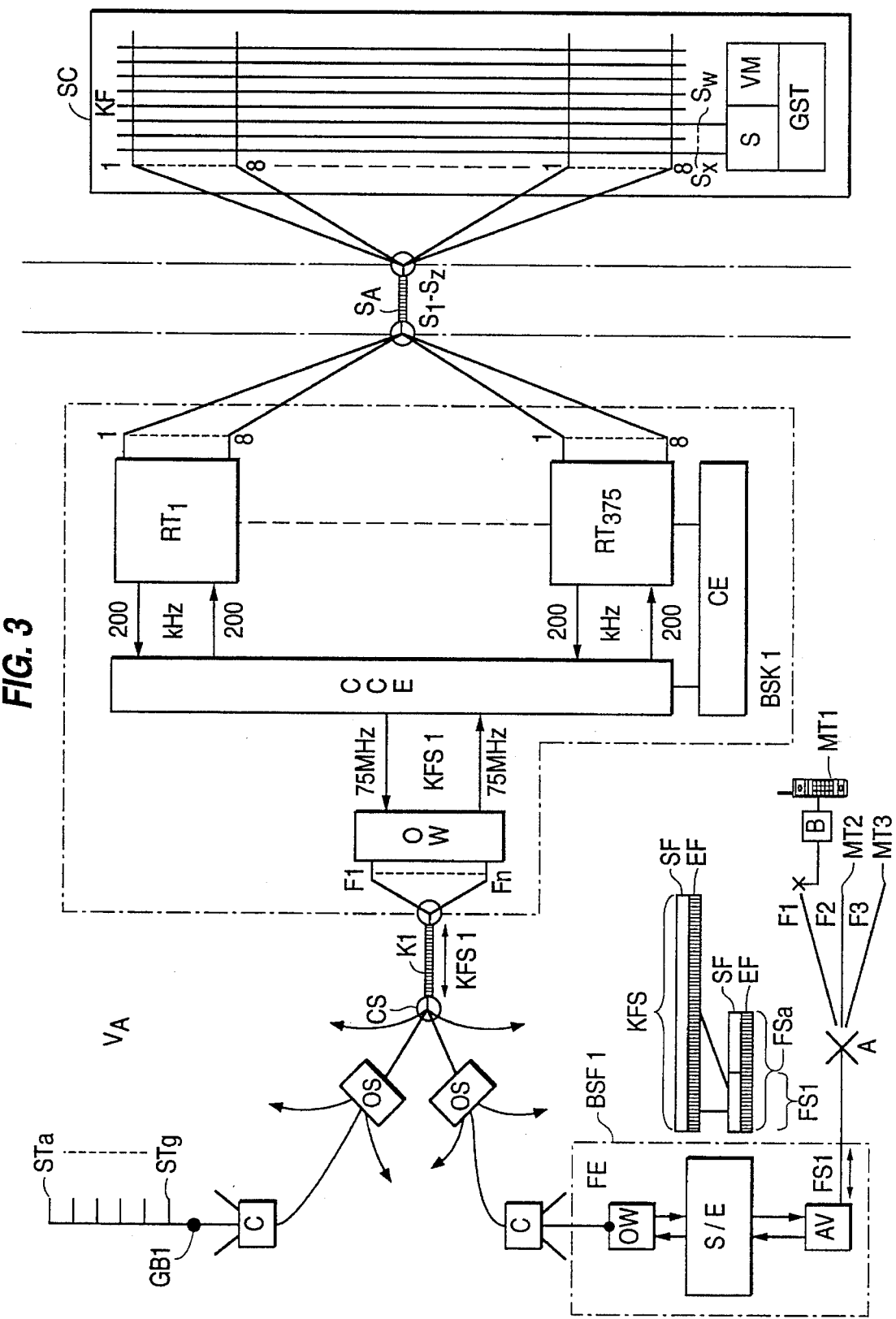
FIG. 3 shows the structure of the exchange and the transmission element connected to it, with the broad-band cable supplied by said transmission element and with the subscribers connected to said broad-band cable, as well as the mobile subscribers, connected via the radio base stations.

FIG. 3 shows details of the circuitry of the exchange SC, of the transmission element BSK1, of the radio base station BSF1, of the broad-band cable K1 and of the stationary network accesses STa–STg insofar as they are of relevance to the method according to the invention.

In a typical application, in a supply area VA, for example, 3,000 communication-channel pairs are connected from the switching network KF of the exchange SC in the form of digital channels/channel pairs S1–Sz via the digital signal line SA to the transmission element BSK1. The trunk group of digital channels/channel pairs contains a plurality of common signalling channels Sx–Sw, which are connected via the switching network KF to the control apparatus S and the common control GST.

The transmission element BSK1 consists basically of the conversion apparatuses RT1–RT 375, which convert the digital channels/channel pairs S1–Szz into groups each of 8 channel pairs and convert using the FDMA/TDMA (Frequency Division Multiple Access/Time Division Multiple Access) method and offer them in the form of individual frequency ranges each of 2×200 kHz to the cable-switching apparatus CCE, which puts together the cable frequency spectrum KFS1 with 2×75 MHz, which is injected into the broad-band cable K1 via the optoelectronic transducer OW.

The broad-band fibre-optic cable K1 consists of a plurality of fibres F1–Fn, which, via cable splitter CS, optical-energy divider OS and road-verge distributor C in the form of a tree-cable distributor, permit the optimal distribution of the cable frequency spectrum across the entire supply area.

With reference to the example of the radio base station BSF1, FIG. 3 shows the connection of mobile subscribers MT1–MT3 and, via the building booster (as conventionally employed in shared-antenna systems) GB1, the connection of stationary subscribers STa–STg.

The radio-base-station terminal FE has an optoelectronic transducer OW, which makes available the entire cable frequency spectrum KFS1 at the input of the transmitting/receiving apparatus S/E, consisting of 3,000 transmitting radio channels SF and 3,000 receiving radio channels EF.

The common signalling channels sx–sw are situated basically in a fixed frequency position and are therefore accessible to the S/E, with the result that it is possible for control information to be exchanged between the control apparatus S and the common control GST of the exchange SC, on the one hand, and the transmitting/receiving apparatus S/E of the radio-base-station terminals FE, on the other hand.

With said control information, the exchange SC controls the position and size of the radio-frequency ranges FS1–FSn within the radio-frequency spectrum FSa of the radio-supply layer FLa;

the assignment of the radio channels of the cable frequency spectrum KFS1 to the radio-frequency range, e.g. FS1.

The thus generated radio-frequency range, e.g. FS1, is transformed at the output of the transmitting/receiving apparatus E/S into the frequency band, e.g. 900 MHz, with the transmitting radio channels SF being situated, for example, in the lower sideband and with the receiving radio channels EF being situated in the upper sideband. Via the antenna booster AV, the radio-channel pairs are transmitted and received within the radio-frequency range. Therefore, each mobile subscriber MT1–MT3 has access to all communication-channel pairs, even if to only a limited number at a time, via the radio paths F1, F2, F3. The radio-frequency range, e.g. FS1, also contains common signalling-channel pairs, via which, in the case of a call, the common control GST of the exchanges SC selects switchable channel filters in the terminals of the subscribers MT1–MT3 and, in this manner, ultimately switches through the individual assignment of a communication-channel pair from the subscriber MT1–MT3 via the radio-channel pairs extending in the radio-frequency range FS1; the conversion in the transmitting/receiving apparatus S/E to the cable frequency spectrum KFS1 and via one of the there present radio-channel pairs of the broadband cable K1 and the conversion apparatuses RT1–RT375 of the transmission element BSK1, the digital signal lines SA to a specific connection point of the switching network KF of the exchange SC.

The stationary subscribers STa–STg have access in functionally identical manner to the exchange SC, with, however, the building booster GB1 making the entire cable frequency spectrum KFS1 accessible to the subscribers STa–STg without limitation of the radio-channel pairs.

The monitoring apparatus CE supplies the RT and CCE with the clock frequencies necessary for modulation/demodulation.

What is claimed is:

1. A circuit arrangement for switched networks containing exchanges, in which mobile subscribers (MT1–MTw) via radio paths and stationary subscribers (STa–STn) via cable paths each have access to an exchange (SC), the radio paths and the cable paths each providing multiple communication channel pairs, and in which each mobile subscriber as well as each stationary subscriber has a terminal device to which is assigned identification with which the subscriber identifies himself and is thus identified and located by the exchange at any location within the switched network independent of whether mobile or stationary, whereafter, for the establishment of a connection from the subscriber to the exchange or vice versa, a communication channel pair is assigned from the provided pairs, so that the mobile and stationary subscribers have access to the same exchange, said cable paths being broad-band cables connected by branches of the television cable connection type to individual subscribers, said cables being routed throughout subscriber areas and extending up to the stationary subscribers, without intervention by the exchange after the assignment of the communication-channel pair and without connection by means of wired channels other than said branches to the cables, whereby each subscriber, whether mobile or stationary, is reached in operationally identical manner and each mobile subscriber and each stationary subscriber has access to all the communication channel pairs which are provided by the respective radio paths and cable paths and whereby each subscriber can set up calls and can be reached at any location under his identification, characterized in that additionally connected to the broad-band cable (K1), apart from the stationary subscribers (STa–STn), are radio base stations (BSF1–BSFn, BSFx–BSFz) of the mobile subscribers (MT1–MTw), said radio base stations (BSF1–BSFn, BSFx–BSFz) likewise having access, in operationally identical manner to the stationary subscribers (STa–STn), to all communication-channel pairs made available by the exchange (SC) through the broad-band cable (K1), with the radio base stations (BSF1–BSFz) each being connected to the broad-band cable (K1) through the intermediary of terminals (FE1–FEz) of the radio-base station, said radio-base-station terminals being operable (FE1–FEz) to convert the respective communication-channel pair to the radio-frequency range (FS1–FSz) of the radio base station (BSF1–BSFz) in question, with a common transmission element (BSK1) with a frequency coverage being connected before the broad-band cable (K1), said common transmission element (BSK1) being operable to convert the communication-channel pairs made available in the exchange (SC) to a cable-frequency spectrum (KFS) encompassing all communication-channel pairs both of the stationary (STa–STn) and also of the mobile subscribers (MT1–MTw), and vice versa.

2. Circuit arrangement according to claim 1, characterized in that a plurality of groups of radio base stations (BSF1–BSFn, BSFx–BSFz) is connected to the broad-band cable (K1), the radio channels of said radio base stations (BSF1–BSFn, BSFx–BSFz) each being situated in different frequency bands (radio-frequency layers Fa–Fd).

3. Circuit arrangement according to claim 1 or 2, characterized in that the exchange (SC) has a control apparatus (S) which assigns selected radio channels to a radio base station (BSF1–BSFn), this selection being from radio channels available to a group of radio base stations (e.g. FSF1–BSFn), said radio channels being transmitted through transmitting/receiving apparatuses (S/E) provided in said radio base stations (BSF1–BSFn) said control apparatus (S) storing said assignment with regard to the number and respective frequency position of the individual radio channels and fixing said assignment in optionally variable manner in each radio base station (BSF1–BSFn) by activation of the relevant transmitting/receiving apparatuses (S/E).

4. Circuit arrangement according to claim 3, characterized in that the control apparatus (S) comprises a traffic-measuring means (VM) for determining the traffic load on a group of radio base stations (e.g. BSF1–BSFn) and communicating to the control apparatus (S) load signals representing the traffic load, with the control apparatus (S), in assigning the radio channels, being operative to take account of the location of said radio base stations (BSF1–BSFn) by combining the load signals with interference indicators which indicate mutually interfering radio channels.

5. Circuit arrangement according to any one of claims 1, 2 and 4, characterized in that the mobile subscribers (MT1–MTw) and the stationary subscribers (STa–STn) are provided with uniform subscriber terminals.

\* \* \* \* \*